(12) United States Patent
Xiong et al.

(10) Patent No.: US 11,087,168 B2
(45) Date of Patent: Aug. 10, 2021

(54) METHOD AND APPARATUS FOR POSITIONING TEXT OVER IMAGE, ELECTRONIC APPARATUS, AND STORAGE MEDIUM

(71) Applicant: TENCENT TECHNOLOGY (SHENZHEN) COMPANY LIMITED, Guangdong (CN)

(72) Inventors: Kun Xiong, Shenzhen (CN); Jian Ye Chen, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 100 days.

(21) Appl. No.: 16/653,243

(22) Filed: Oct. 15, 2019

(65) Prior Publication Data

US 2020/0117943 A1    Apr. 16, 2020

Related U.S. Application Data

(63) Continuation of application No. PCT/CN2018/113437, filed on Nov. 1, 2018.

(30) Foreign Application Priority Data

Nov. 3, 2017 (CN) .......................... 201711071099.4

(51) Int. Cl.
*G06K 9/40* (2006.01)
*G06K 9/46* (2006.01)

(52) U.S. Cl.
CPC ............. *G06K 9/4638* (2013.01); *G06K 9/40* (2013.01); *G06K 9/4652* (2013.01); *G06K 2009/4666* (2013.01)

(58) Field of Classification Search
CPC ....... G06K 9/4638; G06K 9/325–3266; G06K 9/40; G06K 9/4652; G06K 2009/4666; G06K 2009/00489; G06K 2209/00–03
See application file for complete search history.

(56) References Cited

U.S. PATENT DOCUMENTS 6,332,046 B1 * 12/2001 Fujimoto ........... G06K 9/00463
382/174
2009/0290751 A1 * 11/2009 Ferman .................. G06K 9/325
382/100

(Continued)

FOREIGN PATENT DOCUMENTS

| CN | 101770576 A | 7/2010 |
| CN | 101777124 A | 7/2010 |

(Continued)

OTHER PUBLICATIONS

International Search Report for PCT/CN2018/113437 dated Jan. 30, 2019 [PCT/ISA/210].

*Primary Examiner* — Sean T Motsinger
(74) *Attorney, Agent, or Firm* — Sughrue Mion, PLLC

(57) ABSTRACT

A method for locating text in an image is provided. Binarization processing is performed on the image, to set pixel points corresponding to text in the image to a specified color, and a binary image is obtained. A connected domain of pixels of the specified color in the binary image is detected, to obtain a candidate connected region. Connected domain candidate boundaries corresponding to a text region are extracted from the binary image, and the extracting is based on boundaries of the candidate connected region in the binary image and a text arrangement direction. The text region is obtained in the image by using the connected domain candidate boundaries.

18 Claims, 15 Drawing Sheets

(56) References Cited

U.S. PATENT DOCUMENTS

2016/0028921 A1* 1/2016 Thrasher ............ H04N 1/40012
358/519
2017/0109576 A1* 4/2017 Shustorovich .......... G06T 7/187

FOREIGN PATENT DOCUMENTS

| CN | 102054271 A | 5/2011 |
| CN | 102163284 A | 8/2011 |
| JP | 2007-073048 A | 3/2007 |

* cited by examiner

METHOD AND APPARATUS FOR POSITIONING TEXT OVER IMAGE, ELECTRONIC APPARATUS, AND STORAGE MEDIUM

CROSS-REFERENCE TO RELATED APPLICATION(S)

This application is a continuation application of International Application No. PCT/CN2018/113437, filed on Nov. 1, 2018, which claims priority to Chinese Patent Application No. 201711071099.4, entitled "METHOD AND APPARATUS FOR LOCATING TEXT IN IMAGE, ELECTRONIC DEVICE. AND STORAGE MEDIUM" filed on Nov. 3, 2017, the disclosures of which are incorporated by reference in their entireties.

BACKGROUND

1. Field

Example embodiments of the disclosure relate to the field of multimedia application technologies, and in particular, to a method and an apparatus for locating text in an image, an electronic apparatus, and a computer-readable storage medium.

2. Description of the Related Art

With rapid development of computer technologies and multimedia technologies, multimedia information focused on images and videos is widely applied to various fields. Images or videos may be used as page content, and text with content may be embedded in the images, to reflect information related to the images to some extent.

In a system implementation of images and videos, the images are often provided to the system through some data sources, to further execute various processing algorithms, for example, an artificial intelligence (AI) image processing algorithm, so that functions in the system can be implemented based on the images.

As a result, locating a text region in an image is needed. For example, when various processing algorithms are executed on images, the most common data sources are hardware devices such as a camera of a surveillance video. The hardware devices add various types of text, such as a time label and an address label to images acquired in an image acquisition process.

For the execution of the processing algorithms, due to the existence of the text in the images, the processing algorithms need to increase processing unrelated to finally obtained processing results. For example, in the AI image processing algorithm, processing complexity and difficulty are increased, and errors and failures in algorithm training may also be caused easily. Therefore, detecting text location in an image is needed.

In addition, for the text in the image, due to different types or even different manufacturers of hardware devices, position placements of the text in the image are different. Therefore, the implementation of the text location detection in the image that can be applied to various situations, and have a high general applicability is needed.

However, in the existing text locating method, a character recognition technology such as optical character recognition (OCR) or a mathematical model based on large data is mainly used. In the character recognition technology such as OCR, first, preprocessing is performed on an image, then, character recognition is performed to obtain specific text content from the image, namely, characters included in text in the image, and finally, a region recognized as characters is found and an external rectangle is used to surround the region. In this way, a text region in the image can be obtained.

In a method of detecting the text location implemented by using the mathematical model based on large data, after some preprocessing is performed on an image, a rough candidate text region (which may include a text region or not include a text region) is located, and then, large data are used to train a model, for example, a neural network model, to use the large data to distinguish characters in the input image by using the trained model. The external rectangle is used to include a text region obtained by using the distinguished characters.

Costs of using the character recognition technology are very high. First, the system implementation is overly complicated, and there is no need to recognize specific characters, which increases the system burden, and has limitations of reducing efficiency and accuracy.

To detect text location implemented by using the mathematical model based on large data, computation requirements are very excessive, and scenario parameters need to be selected and configured. Scenario parameters used between various scenarios are very different, and therefore are difficult to be actually applied to various applications such as a video surveillance application, and thus, the general applicability is poor.

Therefore, in the text location detection performed in the image, there are many technical difficulties such as overly complicated implementation, large amounts of computations, and parameter configurations. Further, it is difficult to achieve high efficiency, accuracy, and general applicability to perform the text location detection in an image or a video.

SUMMARY

One or more example embodiments provide a method and an apparatus for locating text in an image, an electronic apparatus, and a computer storage medium, which can solve the technical problem in the related art and achieve high efficiency, accuracy, and general applicability to perform the text location detection in an image or a video.

According to an aspect of an example embodiment, there is provided a method for locating text in an image, performed by at least one processor. Binarization processing is performed on the image, to set pixel points corresponding to text in the image to a specified color, and a binary image is obtained. A connected domain of pixels of the specified color in the binary image is detected, to obtain a candidate connected region. Connected domain candidate boundaries corresponding to a text region are extracted from the binary image, and the extracting is based on boundaries of the candidate connected region in the binary image and a text arrangement direction. The text region is obtained in the image by using the connected domain candidate boundaries.

The performing the binarization processing may include: performing the binarization processing to set first pixel points corresponding to dark text and second pixel points corresponding to light text in the image to a first color and a second color, respectively, by using a first threshold and a second threshold, and obtaining binary images respectively corresponding to the dark text and the light text.

The detecting the connected domain may include: performing connectivity search of the pixels of the specified color in the binary image, to obtain a connected block corresponding to the pixels of the specified color; and obtaining a rectangular boundary for each connected block, and obtaining the candidate connected region according to the rectangular boundary.

The obtaining the candidate connected region may include: obtaining, for each connected block, a rectangular boundary matching the connected block, and forming a connected region by using the rectangular boundary; and filtering out a noise connected region from the connected region, to obtain the candidate connected region.

The located text in the text region may include a time label and an address label added by a camera that captured the image, and the filtering out the noise connected region includes: screening connected regions by applying screening parameters to the time label and the address label added by the camera, to obtain the candidate connected region based on a result of the screening; and the screening parameters including at least one of a connected region shape, a proportion of an area of the rectangular boundary to a quantity of actually connected pixels of the specified color included in the connected block, or a position characteristic of the rectangular boundary.

The extracting the connected domain candidate boundaries may include: determining a pixel pair position corresponding to the same quantity of the boundaries of the candidate connected region in a direction perpendicular to the text arrangement direction in the binary image; and extracting the connected domain candidate boundaries of the text region in the text arrangement direction by using the pixel pair position.

The obtaining the text region may include: extracting linear candidate boundaries in the candidate connected region according to the connected domain candidate boundaries and a text line feature; and selecting a connected domain candidate boundary and a linear candidate boundary according to a quantity of lines matching the text line feature in the candidate connected region, to obtain the text region in the image.

The binary image may include binary images respectively corresponding to light text and dark text, and the performing the binarization processing includes: combining the binary images respectively corresponding to the light text and the dark text to obtain a combined image, the linear candidate boundaries being extracted based on the combined image.

The selecting the connected domain candidate boundary and the linear candidate boundary may include: determining, for the connected domain candidate boundary and the linear candidate boundary extracted for each candidate connected region, the text region in the image by using the linear boundary in a case that the quantity of lines matching the text line feature in the connected region is greater than a specified threshold; and determining the text region in the image by using the connected domain candidate boundary in a case that the quantity of the lines matching the text line feature in the connected region is not greater than the specified threshold.

The extracting the linear candidate boundaries may include: obtaining a line set matching the text line feature for the candidate connected region; and extracting the linear candidate boundaries by using the line set, the candidate connected region, and the connected domain candidate boundaries.

The obtaining the line set may include: performing edge detection on the candidate connected region to obtain an edge image; performing extension processing on lines matching the text line feature in the edge image to obtain an extended image for enhancing linear features; and performing linear detection on the extended image to obtain the line set matching the text line feature in the candidate connected region.

Before the performing edge detection on the candidate connected region to obtain an edge image, the obtaining the line set may further include: traversing the pixels of the specified color in the candidate connected region, and removing the pixels of the specified color in a case that widths between the pixels of the specified color in a surrounding natural direction and a diagonal direction and corresponding stroke edge pixel points are within a width threshold range.

The extracting the linear candidate boundaries may include: locating, pixel point by pixel point in a first direction perpendicular to the text arrangement direction in the candidate connected region, a first region in which a highest number of lines match the text line feature and that is formed according to widths between the connected domain candidate boundaries, and locating a second region in the same manner as the first region in a second direction opposite to the first direction; extracting a region boundary pair with a greatest relative width in the text arrangement direction based on the first region and the second region; determining a center of the linear candidate boundaries in the first direction perpendicular to the text arrangement direction according to a relative width between the region boundary pair; and extracting the linear candidate boundaries according to the center and the widths between the connected domain candidate boundaries.

According to an aspect of an example embodiment, there is provided an apparatus for locating text in an image, the apparatus including: at least one memory operable to store program code; and at least one processor operable to read the program code and operate as instructed by the program code, the program code including: binarization code configured to cause at least one of the at least one processor to perform binarization processing on the image, to set pixel points corresponding to text in the image to a specified color, and to obtain a binary image; connected domain detection code configured to cause at least one of the at least one processor to detect a connected domain of pixels of the specified color in the binary image, to obtain a candidate connected region; connected domain candidate boundary extraction code configured to cause at least one of the at least one processor to extract connected domain candidate boundaries corresponding to a text region from the binary image, extraction being based on boundaries of the candidate connected region in the binary image and a text arrangement direction; and a text region obtaining code configured to cause at least one of the at least one processor to obtain the text region in the image by using the connected domain candidate boundaries.

The binarization code may cause at least one of the at least one processor to: perform the binarization processing to set first pixel points corresponding to dark text and second pixel points corresponding to light text in the image to a first color and a second color, respectively, by using a first threshold and a second threshold, and obtaining binary images respectively corresponding to the dark text and the light text.

The connected domain detection code may cause at least one of the at least one processor to perform: performing connectivity search of the pixels of the specified color in the binary image, to obtain a connected block corresponding to the pixels of the specified color; and obtaining a rectangular boundary for each connected block, and obtaining the candidate connected region according to the rectangular boundary.

The obtaining the candidate connected region may include: obtaining, for each connected block, a rectangular boundary matching the connected block, and forming a connected region by using the rectangular boundary; and filtering out a noise connected region from the connected region, to obtain the candidate connected region.

The connected domain candidate boundary extraction code may cause at least one of the at least one processor to perform: determining a pixel pair position corresponding to the same quantity of the boundaries of the candidate connected region in a direction perpendicular to the text arrangement direction in the binary image: and extracting a connected candidate boundary of the text region in the text arrangement direction by using the pixel pair position.

The text region obtaining code may cause at least one of the at least one processor to perform: extracting linear candidate boundaries in the candidate connected region according to the connected domain candidate boundaries and a text line feature; and selecting a connected domain candidate boundary and a linear candidate boundary according to a quantity of lines matching the text line feature in the candidate connected region, to obtain the text region in the image.

According to an aspect of an example embodiment, there is provided a computer-readable storage medium, storing a computer program, executable by at least one processor, to perform a method for locating text in an image, the method including: performing binarization processing on the image, to set pixel points corresponding to text in the image to a specified color, and to obtain a binary image in which the contrast of the text is enhanced based on the specified color; detecting a connected domain of pixels of the specified color in the binary image, to obtain a candidate connected region; extracting connected domain candidate boundaries corresponding to a text region from the binary image, the extracting being based on boundaries of the candidate connected region in the binary image and a text arrangement direction; and obtaining the text region in the image based on the connected domain candidate boundaries.

BRIEF DESCRIPTION OF THE DRAWINGS

These and/or other aspects will become apparent and more readily appreciated from the following description of the embodiments, taken in conjunction with the accompanying drawing. The accompanying drawings, which are incorporated herein and constitute a part of this specification, illustrate embodiments consistent with the disclosure, and are used to explain the principles of the disclosure together with this specification.

DETAILED DESCRIPTION

Example embodiments are described in detail herein, and examples of the example embodiments are shown in the accompanying drawings. When the following descriptions relate to the accompanying drawings, unless indicated otherwise, same numbers in different accompanying drawings represent same or similar elements. The implementations described in the following example embodiments do not represent all implementations consistent with the disclosure. On the contrary, the implementations are merely examples of apparatuses and methods that are described in detail in the appended claims and that are consistent with some aspects of the disclosure.

Figure 1:
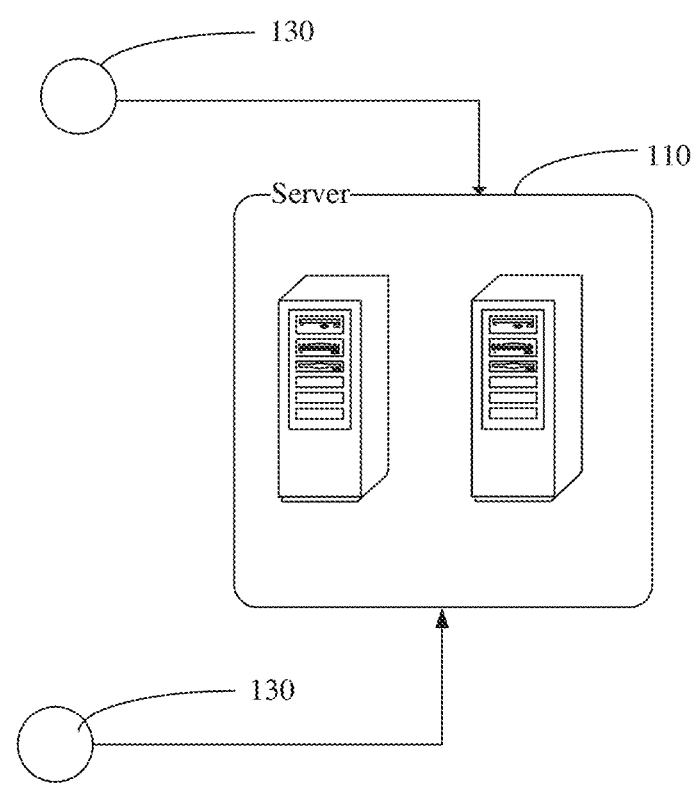
FIG. 1 is a schematic diagram of an implementation environment according to an example embodiment.

FIG. 1 is a schematic diagram of an implementation environment according to an example embodiment.

As shown in FIG. 1, the implementation environment according to an example embodiment includes a server 110, and a data source for providing data, namely, an image. In an example embodiment of the implementation environment, the data source may be a surveillance camera 130.

The surveillance camera 130 is deployed in a real environment, continuously captures images in the real environment, and therefore, continuously transmits transmitting captured images to the server 110.

The image captured by the surveillance camera 130 is automatically added with a time label and an address label. In other words, text content corresponding to a time and text content corresponding to an address are added to the image. For example, the text content corresponding to the time is placed at the top position of the image, and the text content corresponding to the address is placed at the bottom position of the image.

Moreover, according to manufacturer configurations, character colors of the time label and the address label may be the same or may be different from each other. For example, character colors of the time label and the address label may both be black or both be white, or alternatively, may be respectively black and white (or respectively white and black).

The server 110 performs a method for the process in the disclosure on the obtained image, to implement text location detection in the image, which may further be applied to the implementation of various system functions according to the located text region.

The implementation of the text location detection in the image in the disclosure is not limited to corresponding processing logics deployed in the server, and may also be processing logics deployed in other machines, for example, a processing logic used for implementing text location detection in a terminal device having a computing capability.

Figure 2:
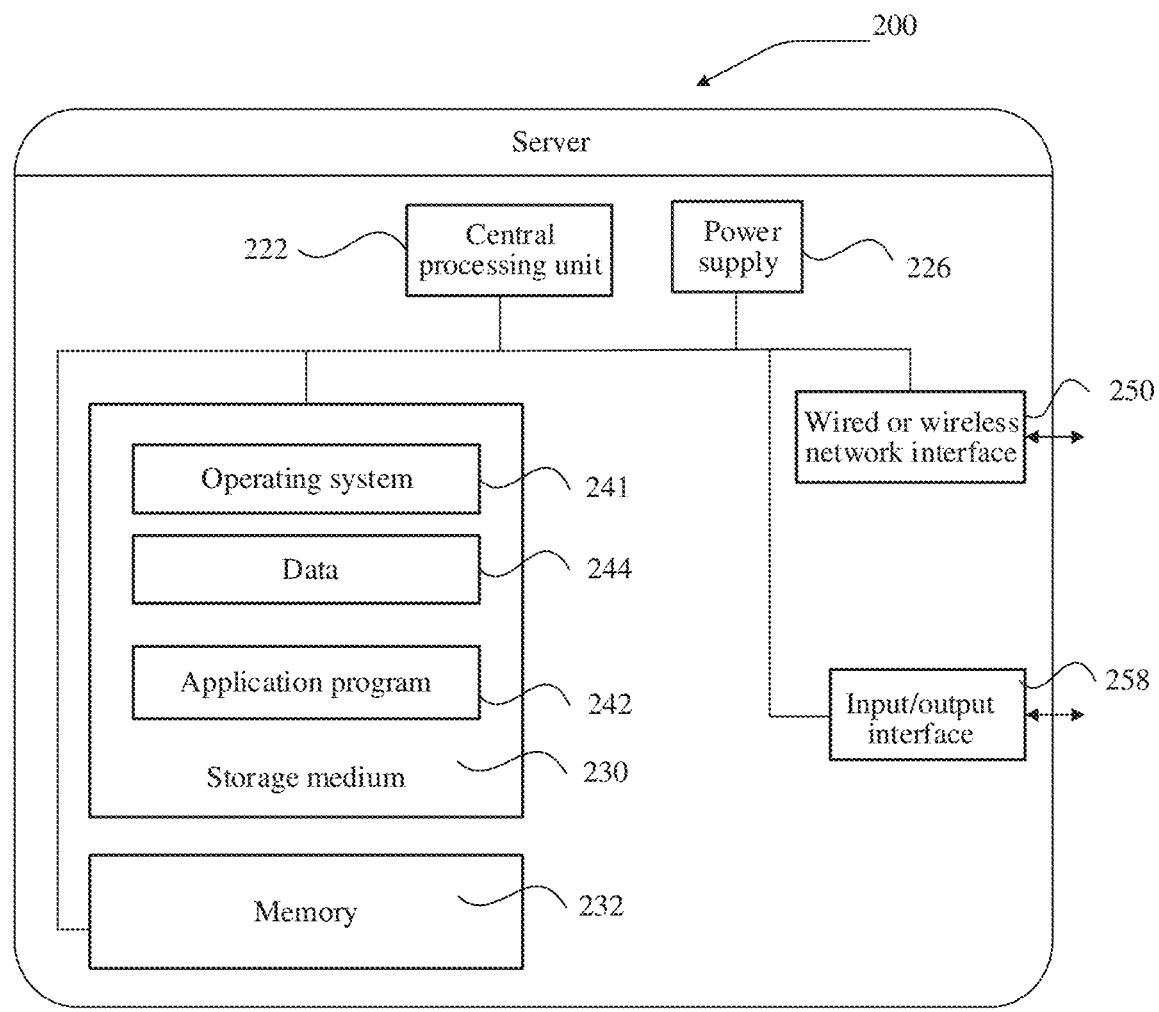
FIG. 2 is a block diagram of a server according to an example embodiment.

FIG. 2 is a block diagram of a server according to an example embodiment.

Figure 9:
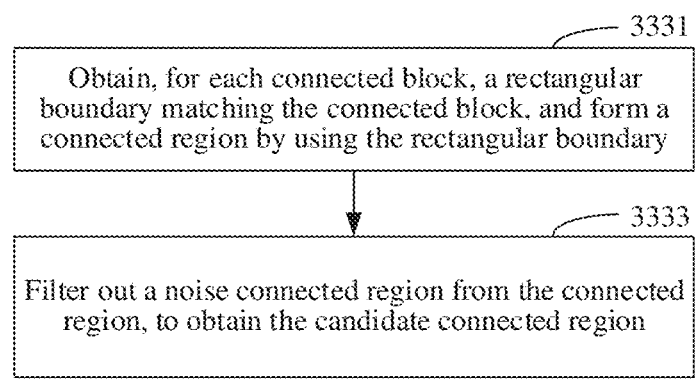
FIG. 9 is a flowchart for describing details of operation 333 according to an example embodiment.
Figure 10:
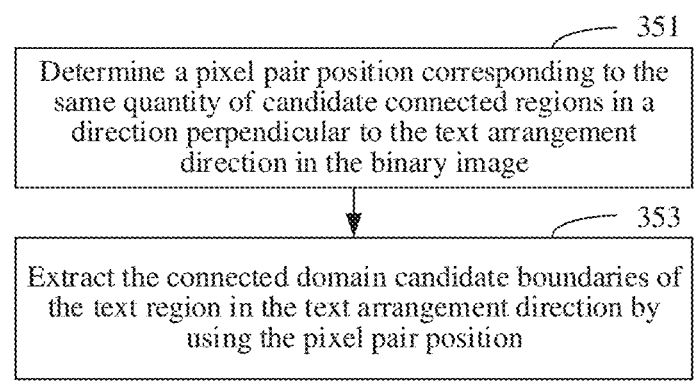
FIG. 10 is a flowchart for describing details of operation 350 according to the embodiment corresponding to FIG. 3.
Figure 12:
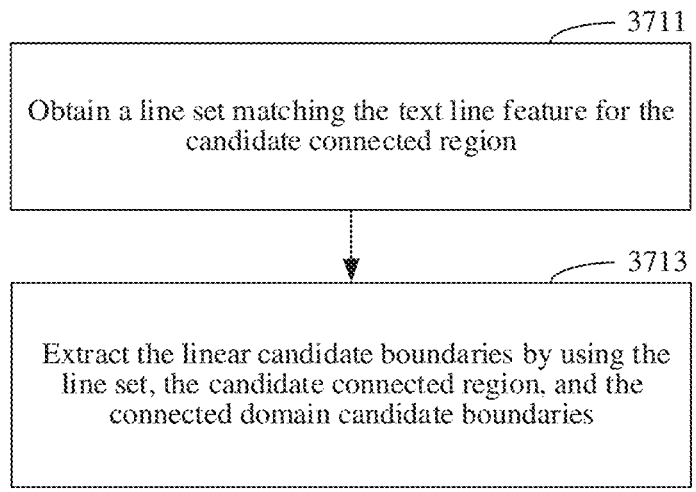
FIG. 12 is a flowchart for describing details of operation 371 according to the embodiment corresponding to FIG. 4.
Figure 13:
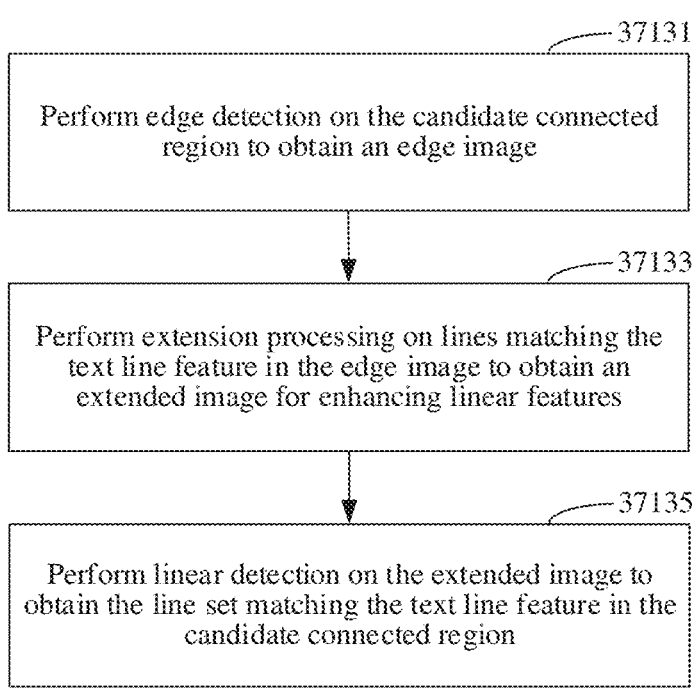
FIG. 13 is a flowchart for describing details of operation 3713 according to the embodiment corresponding to FIG. 12.
Figure 14:
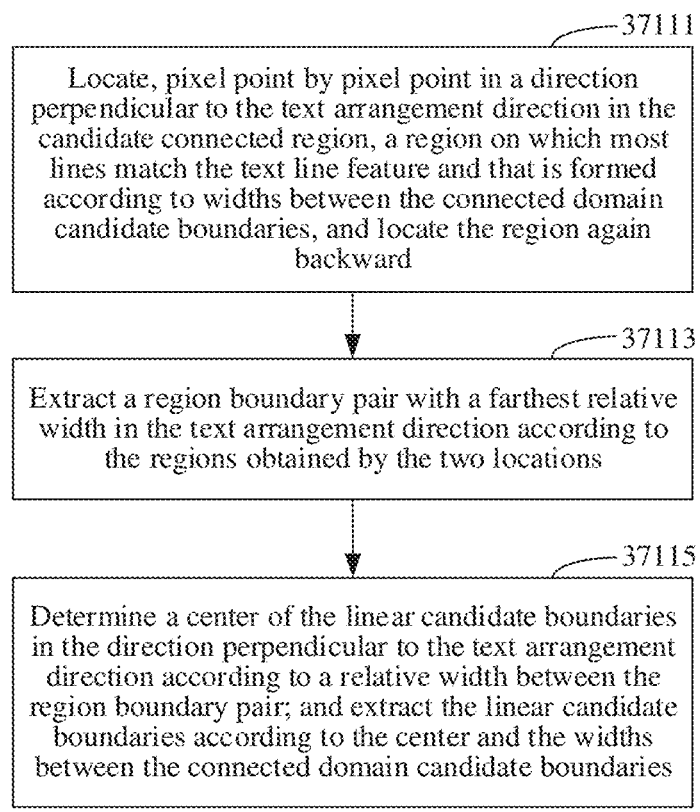
FIG. 14 is a flowchart for describing details of operation 3711 according to the embodiment shown in FIG. 12.

A server 200 as shown in FIG. 2 may vary greatly due to different configurations or performance, and may include at least one central processing unit (CPU) 222 (for example, at least one processor) and a memory 232, and at least one storage medium 230 (for example, at least one mass storage device) storing an application program 242 or data 244. The memory 232 and the storage medium 230 may be transient storages or persistent storages. The program stored in the storage medium 230 may include at least one module (which is not shown in the figure), and each module may include a series of instructions and operations to the server. Still further, the CPU 222 may be configured to communicate with the storage medium 230, and perform, on the server 200, a series of instructions and operations in the storage medium 230. The server 200 may further include at least one power supply 226, at least one wired or wireless network interface 250, at least one input/output interface 258, and/or at least one operating system 241, for example, Windows Server™, Mac OS X™, Unix™, Linux™, and/or FreeBSD™. The operations performed by the server in the embodiments shown in the following drawings of FIG. 3, FIG. 4, FIG. 5, FIG. 6. FIG. 9, FIG. 10. FIG. 12, FIG. 13, and FIG. 14 may be based on the server structure shown in FIG. 2. However, the disclosure is not limited thereto.

Figure 3:
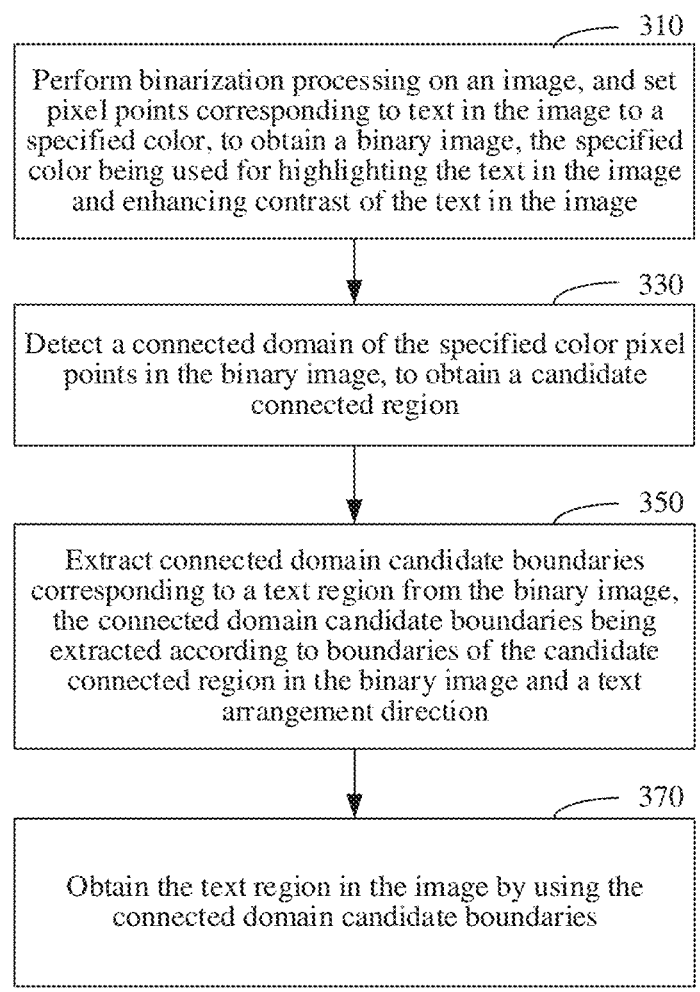
FIG. 3 is a flowchart of a method for locating text in an image according to an example embodiment.

FIG. 3 is a flowchart of a method for locating text in an image according to an example embodiment. The method for locating text in an image is applicable to the implementation environment shown in FIG. 1. The server as shown in the implementation environment of FIG. 2 may be used to perform the method for locating text in an image shown in FIG. 3.

As shown in FIG. 3, the method for locating text in an image includes at least the following operations 310-370.

Operation 310. Perform binarization processing on an image, and set pixel points corresponding to text in the image to a specified color, to obtain a binary image, the specified color being used for highlighting the text in the image and enhancing contrast of the text in the image.

The image is used for executing its own text location detection. It should be understood that the image may be each frame of image provided by video data. Certainly, it should be understood that a single image on which text location detection is to be performed is not limited herein, but the image needs to be determined according to a corresponding data source. However, regardless of which data source the image corresponds to, text location detection is performed by using the image as a unit (that is, in a unit of the image).

For any machine connected to the data source, for example, a server accessed by the data source, after obtaining an image, its processor performs binarization processing on the image, and further automatically implements text location detection in the image. With images continuously inputted by the data source, the machine connected to the data source continuously performs binarization processing on the images, and transmits the images to the subsequent logic implementation.

It should be understood that, the data source may be the surveillance camera 130 shown in FIG. 1, and/or may be a terminal device that uploads images to the machine for performing text location detection, which is not limited herein. In addition, the machine for performing text location detection according to the disclosure is not limited to the machine connected to the data source, and may also be a terminal device that exists alone, for example, a terminal device that needs to perform text location detection on its own image.

The text refers to Chinese characters and other characters such as numeric characters and English characters in the image. The specified color set for the pixel points corresponding to the text in the image includes black, white and other similar or different colors, and may be flexibly set herein according to needs and effects.

In an example embodiment, for illustrative purposes, the specified color set for the text is black. The text may be in a single color or a plurality of colors, and the text is changed to black through the binarization processing, to highlight the text to a great extent and enhance contrast, to ensure accuracy of the subsequent processing process.

The binarization processing process is implemented by using the text in the image as the foreground, and screen content in the image as the background. The pixel points of the image are divided into two parts by using a configured threshold, one part is pixel points corresponding to the text that is different from the screen content by using the threshold, and the color of the pixel points is set to the specified color, for example, black. In this way, the binary image can be obtained.

Further, to enhance accuracy of the binarization processing, pixel points in different colors corresponding to the text and other pixel points are respectively divided into two parts by using a configured threshold, so that the pixel points in different colors can all be set to the specified color.

That is, several thresholds may be configured, to respectively perform binarization processing on the image, and pixel points corresponding to various colors in the text can be obtained and all set to the specified color.

In conclusion, the obtained binary image, in an example embodiment in which text corresponds to a single color, a binary image can be obtained, and one type of threshold may be configured (or used). In an example embodiment in which a plurality of colors exists in an image, the colors are classified, and thresholds are configured (or used) according to the color categories. For example, the colors are classified into two categories, and two types of thresholds may be used corresponding to the two categories of colors, and two types of binary images may be obtained, each type corresponding to either one of the two color categories, to ensure that the pixel points in the text are all set to a specified color, and the specified color pixel points in the obtained binary images are accurately mapped to the text in the image.

Operation 330. Detect a connected domain of the specified color pixel points in the binary image, to obtain a candidate connected region.

The connected region is a region formed by a rectangular boundary on a group (or a cluster) of specified color pixel points, for example, black pixel points. Connected region detection is performed on the specified color pixel points in the binary image, to determine the connected region in the binary image, to further obtain the candidate connected region from the connected region.

It should be understood that, it is very likely that noise exists in the specified color pixel points corresponding to the text of the binary image, and the noise is specified color pixel points not necessarily corresponding to the text. Therefore, a noise connected region may exist in the connected region obtained by performing connected region detection. In specific implementation of an example embodiment, connected region screening needs to be performed, to accurately obtain the candidate connected region.

Operation 350. Extract connected domain candidate boundaries corresponding to a text region from the binary image, the connected domain candidate boundaries being extracted according to boundaries of the candidate connected region in the binary image and a text arrangement direction.

During the foregoing connected domain detection, candidate connected regions distributed throughout the binary image (or distributed in a majority of an area of the binary image) may exist, and the candidate connected regions are surrounded by rectangular boundaries. In the rectangular boundaries forming the candidate connected regions, boundaries of the candidate connected regions matching a text arrangement direction are extracted as the connected domain candidate boundaries.

The text in the same region in the image, for example, the address label and the time label, may be arranged according to, for example, Chinese characters or various other characters (e.g., any other language characters) in a text arrangement direction. Specifically, by using a horizontally displayed image as an example, a plurality of strings of text such as an address label and a time label is added to the image, and is horizontally arranged although respectively in different regions. In this case, the text arrangement direction is a horizontal arrangement direction.

The extracted connected domain candidate boundaries are a line pair corresponding to the same quantity of boundaries of the candidate connected region in a word arrangement direction. The line pair is respectively corresponding to position points in a direction perpendicular to the word arrangement direction. It should be understood that, in an example embodiment, the candidate connected region is a rectangular region, and a string of text is usually covered by several candidate connected regions. In other words, the candidate connected regions represent a string of text, and according to features of the text, the string of text is arranged according to a direction and has an identical width, for example, an identical height, in the vertical direction. Therefore, candidate boundaries of the text region can be extracted according to the text arrangement direction, and the boundaries are the connected domain candidate boundaries.

The connected domain candidate boundaries are extracted with the help of connectivity of characters such as numbers, and the characters cannot be segmented by the extracted connected domain candidate boundaries. In the connected domain candidate boundaries in which characters occupy the majority of portions, in a case that the text corresponding to the connected domain candidate boundaries includes a majority of numbers, the extracted connected domain candidate boundaries are actual boundaries corresponding to the text region.

Therefore, it may be known that, in a case that the text corresponding to the candidate connected region includes a majority of numbers, the corresponding text region can be obtained by obtaining the connected domain candidate boundaries.

However, in the implementation of the text location detection in the image, for a candidate connected region, text content corresponding to the text region and types of characters or Chinese characters in the text region are not recognized, and whether numbers occupy the majority or even all of the portions of the text region cannot be known. Therefore, even if the candidate connected region is extracted, for the text region in which numbers occupy the majority or even all of the portions, subsequent linear candidate boundary extraction still needs to be performed, and further the text region is finally determined by performing cross-validation, to ensure accuracy, and avoid false extraction.

Operation 370. Obtain the text region in the image by using the connected domain candidate boundaries.

The characters such as numbers and English characters have very good connectivity, and correspondingly, the formed text also has good connectivity. Therefore, the text region in the image can be directly and accurately obtained by using the connected domain candidate boundaries.

The Chinese characters have poor connectivity, and correspondingly, the text in which Chinese characters occupies the majority or all of the portions also have the problem of poor connectivity. Therefore, it is difficult to directly obtain the text region by using the connected domain candidate boundaries.

Figure 4:
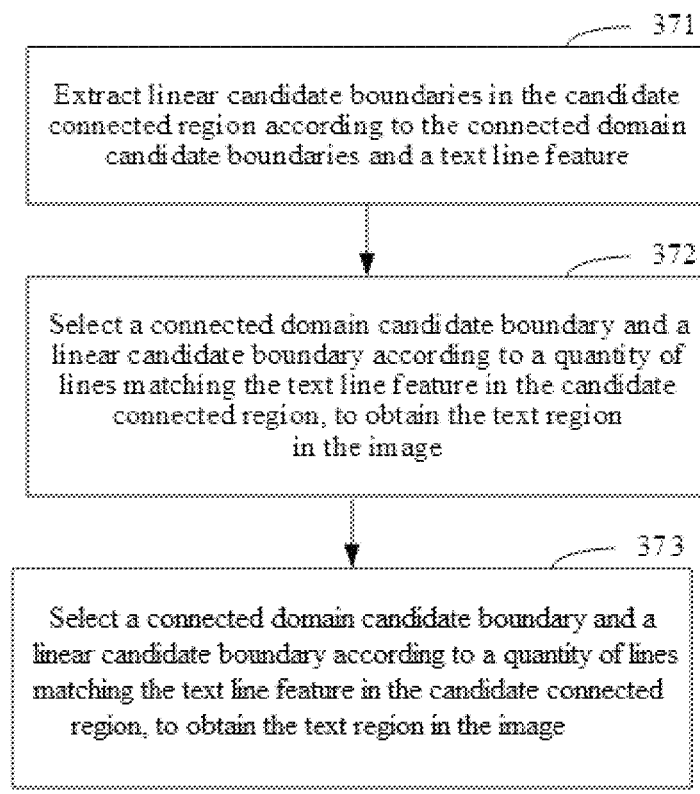
FIG. 4 is a flowchart for describing operation 370 according to the embodiment corresponding to FIG. 3.

FIG. 4 is a flowchart for describing operation 370 in the embodiment of FIG. 3 in detail. As shown in FIG. 4, operation 370 includes operations 371, 372, and 373:

Operation 371. Extract linear candidate boundaries in the candidate connected region according to the connected domain candidate boundaries and a text line feature.

The connected domain candidate boundaries are initially extracted in the text location detection process performed in the image. Based thereon, optimization is further performed to extract boundaries in the text region again, to obtain the linear candidate boundaries.

The linear candidate boundaries are text region boundaries matching the text line feature. The text line feature indicates existent patterns of lines in the text. Different types of characters or different languages of words, for example, words corresponding to Chinese, Korean, Japanese, and Thai, have their corresponding text line features. For example, Chinese characters have many strokes, and strokes have many horizontal lines and vertical lines based on the horizontal direction and the vertical direction. Therefore, the text line feature of the text region in which Chinese characters are located is a horizontal and vertical line feature.

In the candidate connected region, according to the text line feature, regions formed according to widths between the connected domain candidate boundaries are located, pixel point by pixel point, in a direction perpendicular to the text arrangement direction, in other words, in a direction parallel to the connected domain candidate boundaries, to find a region in which a highest number of lines match the text line feature. The extraction of the linear candidate boundaries is completed by obtaining the region in which the highest number of lines match the text line feature.

Further, the obtained linear candidate boundaries exist in pair, and correspondingly, the connected domain candidate boundaries also exist in pair.

For the implementation of the text location detection in the image, because the linear candidate boundaries match the text line feature, the linear candidate boundaries are applicable to the extraction of candidate boundaries in a connected domain candidate region corresponding to a text region in which words with obvious text line features occupy the majority or even all of the portions. In this case, the extracted linear candidate boundaries are actual boundaries of the text region.

Therefore, for a text region in which Chinese characters with many horizontal lines and vertical lines occupy the majority or even all of the portions, the connected domain candidate boundaries extracted in the foregoing operations may cause the Chinese characters to be segmented by the extracted connected domain candidate boundaries, and the text region cannot be accurately obtained by using the connected domain candidate boundaries. Therefore, the corresponding text region needs to be finally determined based on the linear candidate boundaries, to further ensure accuracy of the text location detection.

Operation 373. Select a connected domain candidate boundary and a linear candidate boundary according to a quantity of lines matching the text line feature in the candidate connected region, to obtain the text region in the image.

Through the two extractions of candidate boundaries in the foregoing operations, the connected domain candidate boundary and the linear candidate boundary are obtained. Therefore, for a candidate connected region, there are two types of candidate boundaries, and cross-validation needs to be performed to obtain a more precise result, namely, confirm a most credible candidate boundary. The text region in the image is determined by the candidate boundary indicated by the cross-validation.

The lines in the text are used as words in the text, and especially exist as strokes in Chinese characters. For a candidate connected region, if lines become basic constructions in a corresponding text region, and the quantity of the lines is large, extracted linear candidate boundaries may be determined as actual boundaries of the corresponding text region by using a text line feature matching the lines, and the text region can be accurately located in the image by using the linear candidate boundaries.

For example, for a candidate connected region, a corresponding text region is focused on Chinese characters. Due to the strokes, there are many horizontal lines and vertical lines, and the quantity of lines matching line features in the candidate connected region is the quantity of horizontal lines and vertical lines, and is of a large quantity. Therefore, a linear candidate boundary is selected, and the corresponding text region is obtained by using the linear candidate boundary.

In this way, the cross-validation of the connected domain candidate boundary and the linear boundary is completed. By using the manner, accuracy of the obtained text region is ensured, and general applicability of the implementation of the text location detection in the image is also enhanced. Accordingly, the implementation of the text location detection in the image no longer needs the recognition of text content as a precondition, thereby simplifying the implementation process, and improving efficiency.

Figure 5:
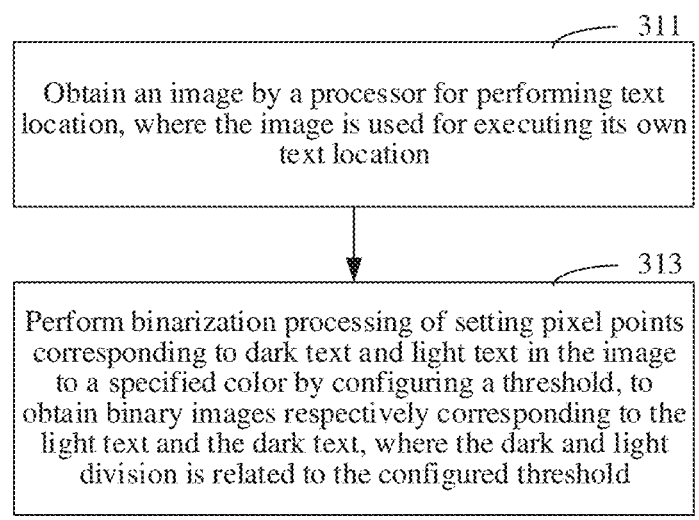
FIG. 5 is a flowchart for describing details of operation 310 according to the embodiment corresponding to FIG. 3.

FIG. 5 is a flowchart for describing details of operation 310 according to the embodiment corresponding to FIG. 3. As shown in FIG. 5, operation 310 includes at least the following operations.

Operation 311. Obtain an image by a processor for performing text location detection, where the image is used for executing its own text location detection.

Operation 313. Perform binarization processing of setting pixel points corresponding to dark text and light text in the image to a specified color by configuring a threshold, to obtain binary images respectively corresponding to the light text and the dark text, where the dark and light division is related to the configured threshold.

As described above, the binarization processing process is setting the pixel points corresponding to the text in the image to the specified color such as black described above by using examples, and by using the configured threshold(s). In this example embodiment, the colors are classified into two categories, one category is dark, and the other category is light color. The threshold configured according to an example embodiment includes a threshold used for distinguishing dark text (or a black threshold), and a threshold used for distinguishing light text (or a white threshold).

Binarization is respectively performed on the image by using the black threshold and the white threshold, to obtain two types of binary images. That is, the binary image includes a black threshold binary image, namely, a binary image corresponding to the dark text, and a white threshold binary image, namely, a binary image corresponding to the light text.

Specifically, first, the image on which text location detection is performed is converted into a grayscale image, and binarization is performed on the grayscale image respectively for the black threshold and the white threshold. The binarization performed for the black threshold changes pixel points whose grayscale is less than the black threshold to the specified color (e.g., black), and changes pixel points whose grayscale is equal to or greater than the black threshold to other color(s). Accordingly, the binarization processing of changing the dark text to black is implemented. When the specified color is black, other pixel points may be changed to white. The binarization performed for the white threshold changes the pixel points whose grayscale is greater than the white threshold to the specified color (e.g., black), and changes other pixel points whose grayscale is equal to or lower than the white threshold to other color(s), to implement binarization processing of changing the light text to black.

Therefore, in the obtained binary image, the specified color pixel points corresponding to the dark text are distributed in the binary image corresponding to the dark text, namely, the black threshold binary image, and the specified color pixel points corresponding to the light text are distributed in the binary image corresponding to the light text, namely, the white threshold binary image. In this way, for text in various colors distributed in the image, corresponding pixel points are distributed in the binary image corresponding to the dark text and the binary image corresponding to the light text. Certainly, when the number of distributed colors of the text in the image is single, for example, are all dark or light, black pixel points are mostly or all distributed in one binary image, and the other binary image has no or only a little distribution of black pixel points.

In an example embodiment, according to the text region obtaining shown in the embodiment corresponding to FIG. 4, operation 310 is performed after operation 311 and operation 313 are performed, and operation 310 further includes: combining the binary images respectively corresponding to the light text and the dark text to obtain a combined image, where the combined image is used for extracting the linear candidate boundaries.

As described above, the binarization processing is performed on the pixel points corresponding to the text to the specified color, for example, black, and the specified color exists in the binary image. The binary image includes a binary image corresponding to the dark text and a binary image corresponding to the light text. In this case, the two images needs to be combined so that the specified color pixel points corresponding to the text exist in an image obtained after the combination, namely, a combined image.

In this way, the obtained combined image is used for subsequently extracting the linear candidate boundaries, and the binary image is used for extracting the connected domain candidate boundaries, to further ensure accuracy and integrity.

Figure 6:
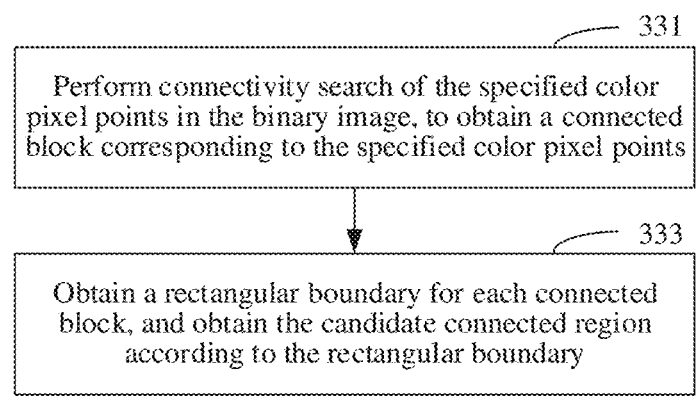
FIG. 6 is a flowchart for describing details of operation 330 according to the embodiment corresponding to FIG. 3.

FIG. 6 is a flowchart for describing details of operation 330 according to the embodiment corresponding to FIG. 3. As shown in FIG. 5, operation 330 includes at least the following operations 331 and 333.

Operation 331. Perform connectivity search of the specified color pixel points in the binary image, to obtain a connected block corresponding to the specified color pixel points.

The connected block is a set formed by the specified color pixel points. The specified color pixel points are aggregated, and upon aggregating any specified color pixel point, the process moves to a neighboring specified color pixel point so that any other pixel point in the entire set may be reached.

Figure 7:
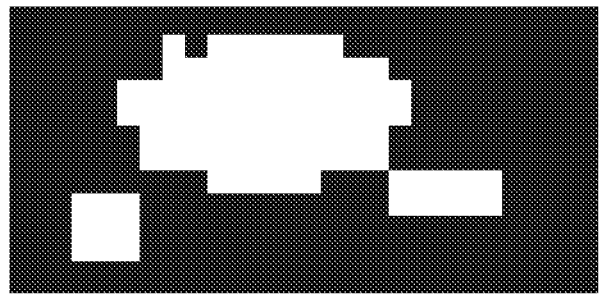
FIG. 7 is a schematic diagram of a connected block in a binary image according to an example embodiment.
Figure 8:
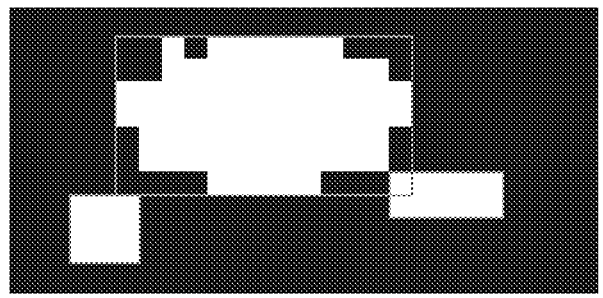
FIG. 8 is a schematic diagram of a candidate connected region according to the embodiment corresponding to FIG. 7.

FIG. 7 is a schematic diagram of a connected block in a binary image according to an example embodiment. After connectivity search is completed for the black pixel points in the binary image, three connected blocks shown in FIG. 7 are obtained. FIG. 8 is a schematic diagram of a candidate connected region according to the embodiment corresponding to FIG. 7. After operation 333 is performed, three candidate connected regions including the candidate connected region according to the rectangular boundary shown in FIG. 8 can be obtained.

Operation 333. Obtain a rectangular boundary for each connected block, and obtain the candidate connected region according to the rectangular boundary.

After connectivity search of the binary image is completed, the obtained connected block is stored in a rectangular region, and the rectangular region is a connected region corresponding to the connected block, so that the candidate connected region can be obtained by using the connected region.

That is, for each connected block, a boundary is determined according to horizontal lines and vertical lines externally connected to the connected block, and the rectangular boundary of the connected block is obtained based on the horizontal lines and the vertical lines externally connected to the connected block, to form the connected region. The boundary may be based on the horizontal lines and the vertical lines that connect to the connected block and have a shortest length.

The obtained connected region may be used as the candidate connected region, to extract candidate boundaries, and to further finally obtain the text region in the image.

In specific implementation of an example embodiment, after the connected region in the binary image is obtained, a mechanism may also be introduced to filter the obtained connected region, to accurately determine the candidate connected region.

FIG. 9 is a flowchart for describing details of operation 333 according to an example embodiment. As shown in FIG. 9, operation 333 includes at least the following operations 3331 and 3333.

Operation 3331. Obtain, for each connected block, a rectangular boundary matching the connected block, and form a connected region by using the rectangular boundary.

As described above, the connected block is a set of specified color pixel points, and exists as an entity in the binary image. Therefore, a rectangular boundary including the connected block, namely, a rectangular boundary matching the connected block, is obtained in the horizontal direction and in the vertical direction based on the existence of the connected block in the binary image. The matching between the rectangular boundary and the connected block is externally connected to the connected block, or close to a connected block edge to a great extent. The plurality of rectangular boundaries obtained for the connected block forms the connected region in the binary image.

Operation 3333. Filter out a noise connected region from the connected region, to obtain the candidate connected region.

For characteristics of the connected region corresponding to the text in the binary image, namely, the candidate connected region in various different scenarios, a mechanism is introduced to perform screening on the obtained connected region, and a connected region passing through the screening finally becomes the candidate connected region. The scenarios include a real scenario of capturing an image, for example, a real scenario in which a large object exists, or a real scenario in which light, shadow, and noise may exist; and also include a functional scenario of capturing an image. For example, if an image on which text location detection is performed is from a video surveillance scenario, the text may be a time label and an address label added to the camera in the video surveillance.

Different scenarios have different shape characteristics, position characteristics, and pixel point characteristics, and screening parameters are configured for an introduced screening mechanism based thereon.

In specific implementation of an example embodiment, the applied screening parameters may include at least one of the followings:

1. A connected region shape, namely, the foregoing rectangular boundary, and the limitations in the width and height.

Based thereon, the width and height of the rectangular boundary are ensured to be within a reasonable range, to filter out overly large and overly small connected regions.

2. A proportion of an area of the rectangular boundary to a quantity of actually connected specified color pixel points in a surrounded connected block.

Based on the above parameters, overly dense and overly sparse connected regions are deleted. Such types of connected regions are determined as noise connected regions and thus are removed.

In a case that the specified color pixel points in the rectangular boundary corresponding to the connected region are overly dense, the connected region is highly unlikely to correspond to Chinese characters, but the large object in the background of the image.

In a case that the specified color pixel points in the rectangular boundary corresponding to the connected region are overly sparse, the connected region is highly unlikely to correspond to the text, but the light, shadow, and noise in the background.

3. Position characteristics of the rectangular boundary.

For example, the rectangular boundary needs to be located at ⅕ of the upper part of the image, and in the video surveillance scenario, the time label is mostly at the upper part of the image.

By introducing the screening mechanism, accuracy of the candidate boundary extraction performed subsequently can be ensured. In addition, the data amount and complexity for the subsequent processing are also reduced, to further effectively increase performance and efficiency.

Further, as described in the embodiment corresponding to FIG. 4, the binary images respectively corresponding to the dark text and the light text are obtained by using the black threshold and the white threshold, to avoid false and/or in accurate detection. In this case, the connected domain detection and the screening are both performed for the specified color pixel points on the binary image corresponding to the dark text and the binary image corresponding to the light text, to obtain a candidate connected region on either binary image, and take an intersection, namely, obtain candidate connected regions of all binary images. In this way, integrity of the text location detection in the image is effectively ensured.

FIG. 10 is a flowchart for describing details of operation 350 according to the embodiment corresponding to FIG. 3. As shown in FIG. 10, operation 350 includes at least the following operations 351 and 353.

Operation 351. Determine a pixel pair position corresponding to the same quantity of candidate connected regions in a direction perpendicular to the text arrangement direction in the binary image.

As described above, the connected domain candidate boundaries are extracted based on the obtained candidate connected region. Because the image is outputted by a data source, especially a specified hardware device such as a camera, and the text is added to the image by the data source, the image and the text have consistencies in some aspects, and the consistencies include, for example but are not limited to, the text arrangement direction.

According to characteristics of the text, characters such as numbers or English characters or Chinese characters are arranged orderly according to a direction. For example, for a horizontally displayed image, the text arrangement direction is a horizontal direction, and has height consistency.

Therefore, the candidate connected region corresponding to the text region is also distributed according to the text arrangement direction, and a relative distance, for example, the height consistency listed above, exists in the direction perpendicular to the text arrangement direction. Therefore, the pixel pair position can be determined in the direction perpendicular to the text arrangement direction according to the quantity of corresponding candidate connected regions in the text arrangement direction.

By using the horizontally arranged numbers in the text region as an example, the horizontally arranged numbers have height consistency. The text region corresponds to a plurality of candidate connected domains, and in the vertical direction, there may exist two pixel point positions that correspond to the same quantity and the largest quantity of rectangular boundaries.

It should be understood that, the pixel pair positions corresponding to the same quantity of candidate connected regions refer to two pixel point positions that can be mapped to the same quantity of rectangular boundaries in the text arrangement direction, and that are mapped to the largest quantity of rectangular boundaries relative to other pixel points. The connected domain candidate boundary is located at the position perpendicular to the text arrangement direction according to the two pixel point positions.

In the candidate connected region, noise causing interference to the location may exist. That is, even if after the screening is performed, the obtained candidate connected region may correspond to noise (or a noise connected region). However, the text region has a length, for example, has many numbers. In this case, there is no interfered character. The candidate connected region that is essentially not the noise connected region occupies the majority portion of the image, and noise and text content may not reach the same level. Therefore, the extracted connected domain candidate boundaries still have very high accuracy. Especially for the text region formed by numbers, because the structure of the numbers has connectivity, the probability of fault or error is very small.

Operation 353. Extract the connected domain candidate boundaries of the text region in the text arrangement direction by using the pixel pair position.

The obtained pixel pair indicates two pixel point position points in the direction perpendicular to the text arrangement direction, and the two pixel point positions construct a pixel pair position. The connected domain candidate boundaries are lines perpendicular to the text direction. Therefore, according to the two position points indicated by the pixel pair position, the connected domain candidate boundaries of the text region can be located.

Figure 11:
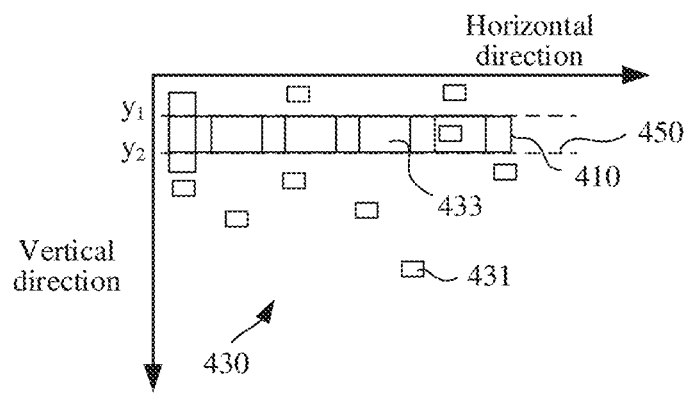
FIG. 11 is a schematic simple diagram for extracting connected domain candidate boundaries according to an example embodiment.

FIG. 11 is a schematic simple diagram for extracting connected domain candidate boundaries according to an example embodiment. In FIG. 11, the rectangular region 410 is a region formed by a string of numbers horizontally arranged, and the text arrangement direction corresponding to the string of numbers is the horizontal direction.

Connected domain detection is performed on the text formed by the string of numbers to obtain the rectangular connected region 430 shown in FIG. 1. The interference element, namely, the noise connected region 431, is removed by using the introduced screening mechanism, to obtain the candidate connected region 433.

In this way, four candidate connected regions 433 may be determined in the vertical direction, and rectangular boundaries of the four candidate connected regions in the horizontal direction correspond to the upper and lower pixel point positions in the vertical direction. The two pixel point positions form the pixel pair position.

Specifically, a coordinate system using the horizontal direction as the x axis and the vertical direction as the y axis is constructed, and rectangular boundaries of the obtained four candidate connected regions are parallel to the x axis and correspond to the same coordinate positions on the y axis, namely, y1 and y2. y1 and y2 are the pixel pair position, and the connected domain candidate boundaries 450 are extracted respectively by using the pixel pair position.

By using this manner, on one hand, for the text formed by characters with good connectivity such as numbers, the text region can be precisely determined, namely, the extracted connected domain candidate boundaries are actual boundaries of the text region, and therefore, the implementation is simple, and the accuracy is very high; on the other hand, for the text with poor connectivity, initial location is performed for the obtaining of the text region, a reliable basis can be provided to the subsequent processing process, and general applicability of the text location detection in the image can be improved.

FIG. 12 is a flowchart for describing details of operation 371 according to the embodiment corresponding to FIG. 4.

As shown in FIG. 12, operation 371 includes at least the following operations 3711 and 3713.

Operation 3711. Obtain a line set matching the text line feature for the candidate connected region.

After the extraction of the connected domain candidate boundaries is completed, linear candidate boundaries are extracted. As described above, the text line feature describes the lines mainly included in the text. In a case that the connectivity in the text is poor, the content, especially, the Chinese character in the text, exists by using a stroke as a unit. The text line feature is a stroke feature, the stroke feature is universal for the text, and candidate boundaries of the text region corresponding to the text can be extracted based thereon, to accurately extract the linear candidate boundaries.

In the candidate connected region, the line set matching the text line feature refers to a set formed by all lines in the candidate connected region that conform to the text line feature.

For the text formed by Chinese characters, or the text formed by many Chinese characters and few similar characters such as numbers, the corresponding text line feature is the horizontal and vertical line feature. In this case, the obtained line set is a set of all horizontal lines and vertical lines in the candidate connected region.

Operation 3713. Extract the linear candidate boundaries by using the line set, the candidate connected region, and the connected domain candidate boundaries.

According to the line set, the text corresponding to the candidate connected region in which many lines exist has linear characteristics, and therefore, the text is very likely to be Chinese characters (e.g., based on lines of which linear characteristics are certain degree or greater). Therefore, the linear candidate boundaries in the candidate connected region are extracted according to the line set and the connected domain candidate boundaries.

The connected domain candidate boundaries described above are lines extracted in pair in the text arrangement direction. Similarly, the extracted linear candidate boundaries are also lines extracted in pair in the text arrangement direction. Moreover, for an image, regardless of which types of characters or words the added text is, the text corresponds to the same text arrangement direction, and widths corresponding to the direction perpendicular to the text arrangement direction, for example, heights in the vertical direction are consistent. Therefore, the linear candidate boundaries can be accurately extracted by using the connected domain candidate boundaries as a basis.

FIG. 13 is a flowchart for describing details of operation 3713 according to the embodiment corresponding to FIG. 12. As shown in FIG. 13, operation 3713 includes at least the following operations 37131, 37133, and 37135.

Operation 37131. Perform edge detection on the candidate connected region to obtain an edge image.

The edge detection is performed to output a stroke edge corresponding to the text. The used boundary detection method may be an edge detection method whose edge detection operator is a canny operator, or may be other various edge detection methods.

Operation 37133. Perform extension processing on lines matching the text line feature in the edge image to obtain an extended image for enhancing linear features.

The lines matching the text line feature refer to lines that exist on the obtained stroke edge and that conform to the text line feature. For example, when the text line feature is the horizontal and vertical line feature, the lines matching the text line feature are the horizontal lines and the vertical lines on the stroke edge.

The extension processing may be performed to supplement an edge junction deleted by the canny operator in the edge detection, so that the long vertical lines and horizontal lines originally in the strokes corresponding to the text can be recovered, and are no longer confused with vertical lines caused by the background noise (the most obvious feature of the vertical lines is short), to improve accuracy.

It should be understood that, in the edge detection, the junction of words with bold font may be deleted. For example, if many horizontal lines are in a vertical line on a stroke, the vertical line may be segmented into many small vertical lines, which may cause inaccuracy of the subsequent linear detection and the extracted linear candidate boundaries. Therefore, the extension processing is particularly important to avoid inaccurate edge detection.

In specific implementation of an example embodiment, the edge image is traversed with ordering. For example, for the extension processing of the vertical line, vertical traversal is performed pixel point by pixel point in the vertical direction. If the current pixel point is on one vertical line, and its next point is also on one vertical line, whether both the current pixel point and the end portion of the previous vertical line are black is compared from a start portion of the current vertical line on which the current pixel point is located. If both are black, it indicates that pixel point discarding caused by the canny operator occurs between the start portion of the current vertical line and the end portion of the previous vertical line, and the pixel points are not discontinuous from the beginning. In this case, black needs to be supplemented in the gap between the start portion of the current vertical line and the end portion of the previous vertical line. In this way, the vertical lines can be extended, and it is ensured that the vertical strokes of the Chinese characters are not segmented. The extension processing process of the horizontal lines is similar, and is not described herein again.

Operation 37135. Perform linear detection on the extended image to obtain the line set matching the text line feature in the candidate connected region.

The linear detection of the extended image is performed. In this way, the set with many lines on the stroke edge matching the text line feature is obtained. For example, when the text line feature is the horizontal and vertical line feature, all horizontal lines and vertical lines on the stroke edge are obtained, and the horizontal lines and vertical lines form the line set matching the text line feature.

In an example embodiment, the linear detection may be performed by using a HoughLine function, but the requirement of the parameter adjustment is relatively high. Therefore, the extended image may be directly traversed to complete the linear detection, the complexity is 0 (w×h), and therefore this approach is advantageous because no parameter needs to be adjusted, and an improved effect can be achieved.

In an example embodiment, before operation 37131, operation 3713 may further include the following operation:

traversing the specified color pixel points in the candidate connected region, and removing the specified color pixel points in a case that widths between the specified color pixel points in a surrounding natural direction and a diagonal direction and corresponding stroke edge pixel points are within a width threshold range.

As described above, the extraction of the linear candidate boundaries may be performed to optimize detection of the connected domain candidate boundaries, and supplements the process for the text including few numbers and many Chinese characters, to accurately obtain the text region corresponding to the text including many Chinese characters and thereby greatly improving accuracy in text location detection.

Through filtering based on strokes, specified color pixel points corresponding to overly large and overly small strokes may be directly filtered out, to further delete much background interference for the candidate connected region. The filtering process based on strokes is also performed for the candidate connected region. In a case that a single binary image is obtained through the binarization processing, after the connected domain detection and the extraction of the connected domain candidate boundaries are directly completed for the binary image, the filtering process based on strokes may be performed.

For at least two binary images obtained through the binarization processing, a corresponding combined image is obtained, and the combined image is used to perform linear detection.

Further, the surrounding natural direction and the diagonal direction are relative to a traversed specified color pixel point. Therefore, whether specified color pixel points whose widths are not within the width threshold range exist in eight directions is determined for the traversed specified color pixel point. If it is determined that none of such a specified color pixel point exists, it indicates that the currently traversed specified color pixel point is interference noise of the background, and the currently traversed specified color pixel point is deleted.

At least specified color pixel points causing the overly large or overly small stroke widths are all removed. For a specified color pixel point whose stroke width is ensured to be within a normal range, during filtering based on strokes, the specified color pixel point is within a pre-determined width threshold range in a direction.

By using this manner, the background interference in the connected block exists in the connected domain detection is eliminated for the text location detection in the image by using universality of stroke features. For each traversed specified color pixel point, the search range of pixel search is limited by the natural direction and the diagonal direction, and comprehensiveness of the filtering is ensured.

FIG. 14 is a flowchart for describing details of operation 371 according to the embodiment shown in FIG. 12. As shown in FIG. 14, operation 3711 includes at least the following operations 37111, 37113, and 37115.

Operation 37111. Locate, pixel point by pixel point in a direction perpendicular to the text arrangement direction in the candidate connected region, a region in which a highest number of lines match the text line feature and that is formed according to widths between the connected domain candidate boundaries, and locate the region again in a backward direction.

As described above, several candidate connected regions obtained after the connected domain detection or even the noise connected region filtering are distributed in the binary image. For each candidate connected region, region location is performed by using the extracted connected domain candidate boundaries as a basis, to locate two regions that are parallel to the connected domain candidate boundaries in the candidate connected region and that have the highest number of lines matching the text line feature.

Because the performing of the region location involves the determining of two regions, regions are designated pixel point by pixel point twice forward and backward along the direction perpendicular to the text arrangement direction, to further determine, based on the quantity of lines matching the text line feature in the designated regions, whether the designated regions are the regions that need to be located.

By using an example in which the text line feature is the horizontal and vertical line feature, and the text arrangement direction is the horizontal direction, the extracted connected domain candidate boundaries are two lines formed in the horizontal direction, and a width exists between the two lines. In this case, in the performed region location, in the candidate connected region, first, each pixel point position i is traversed from top to bottom. For a pixel point position i, the top border row coordinate up=i && and the bottom border row coordinate down=i+ width may be obtained. By using two line pairs formed on the top border row coordinate and the bottom border row coordinate in the horizontal direction, a region is designated from the candidate connected region. In this case, the quantity of horizontal lines and vertical lines in the region is extracted.

By analogy, the traversal of pixel point positions in the candidate connected region from top to bottom is completed, and the largest quantity of horizontal lines and vertical lines is determined according to the quantity of horizontal and vertical lines corresponding to each region. The region corresponding to the largest quantity of horizontal lines and vertical lines is a region obtained by the location.

The region location is performed again backward, namely, traversal is performed pixel point position by pixel point position again from bottom to top. In this case, for each pixel point position, the bottom border row coordinate down=I && and the top border row coordinate up=i+ width are obtained, to finally determine a region obtained by location again from the traversal performed pixel point position by pixel point position from bottom to top.

Operation 37113. Extract a region boundary pair with a farthest (or greatest) relative width in the text arrangement direction according to the regions obtained by the two locations.

Through the traversal of the pixel point positions performed in the foregoing operations, two regions are obtained by two locations. Each region has two region boundaries parallel to the connected domain candidate boundaries. In this case, two region boundaries having the longest relative width are extracted, to form a region boundary pair with the longest relative width.

Operation 37115. Determine a center of the linear candidate boundaries in the direction perpendicular to the text arrangement direction according to a relative width between the region boundary pair: and extract the linear candidate boundaries according to the center and the widths between the connected domain candidate boundaries.

The center between the linear candidate boundaries may be obtained by taking the average of the positions of the region boundaries in the direction perpendicular to the text arrangement direction, to locate and extract the linear candidate boundaries in the direction perpendicular to the text arrangement direction by using the widths between the connected domain candidate boundaries. In this way, the candidate boundary extraction based on the stroke features and the linear features is implemented, so that the text location detection in the image can be applied to a complex text formed by Chinese characters.

In an example embodiment, operation 373 of FIG. 4 includes at least the following operations:

determining, for the connected domain candidate boundary and the linear candidate boundary extracted for each candidate connected region, the text region in the image by using the linear boundary in a case that the quantity of lines matching the text line feature in the connected region is greater than a specified threshold; and determining the text region in the image by using the connected domain candidate boundary in a case that the quantity of the lines matching the text line feature in the connected region is not greater than the specified threshold.

As described above, through the performing of the foregoing operations, after the connected domain candidate boundary and the linear candidate boundary are extracted for each candidate connected region, cross-validation of two candidate boundaries is performed, to determine the selected candidate boundary.

It should be understood that, the text added in the image may include a majority of numbers, and may include characters such as English characters in a few cases. However, the formed text has good connectivity. Therefore, the text region can be precisely obtained based on the connected domain candidate boundaries.

In a case that Chinese characters form the text, the connected domain candidate boundaries may have large errors for the obtaining of the text region, which is a case difficult to process. In this case, the text region can be precisely obtained by using the linear candidate boundaries.

Therefore, whether the text corresponding to the text region is formed by Chinese characters is recognized according to the quantity of lines matching the text line feature in the candidate connected region, to select the linear candidate boundary for the text region of the text formed by Chinese characters. That is, if the quantity of lines matching the text line feature in the candidate connected region exceeds a specified threshold, it is determined that the corresponding text is formed by Chinese characters, or Chinese characters occupy the majority of the text. The specified threshold may be 2 or another value, which is not limited herein.

For the text corresponding to the candidate connected region, if the extracted linear candidate boundaries are inaccurate, the candidate connected region has a few of lines matching the text line feature, and the connected domain candidate boundary is selected to obtain the text region. Therefore, a very low error rate in text location detection is ensured.

A video surveillance scenario is used as an example to describe the foregoing implementation process of the text location detection in the image. In the video surveillance scenario, the image on which text location detection is performed is a video image acquired by a video surveillance camera. With the continuous acquisition of images, the video surveillance camera may receive a video image sequence in real time. Each video image in the video image sequence is added by the video surveillance camera with two categories of text: a time label and an address label. In this case, the text needs to be located.

It should be understood that, for the time label, for example, 12-30-2016 星期五 15:41:08, a majority of which are numbers; and the address label may include Chinese characters in most or all of its portion.

In addition, the time label and the address label may respectively correspond to the black text and the white text.

In this case, the text location detection is performed in the video image.

Specifically, first, a server that has access to the video surveillance camera uses a video image as an original image input, to perform binarization on the video image for the black threshold, and change colors of the pixel points whose grayscale is less than the black threshold to black, namely, black pixel points, and change other colors to white, to obtain a binary image corresponding to black words.

Binarization is performed on the video image for the white threshold, to change the colors of the pixel points whose grayscale is greater than the white threshold to black, or otherwise, change the colors of the pixel points whose grayscale is less than or equal to the white threshold to white, to obtain a binary image corresponding to white words.

Figure 15:
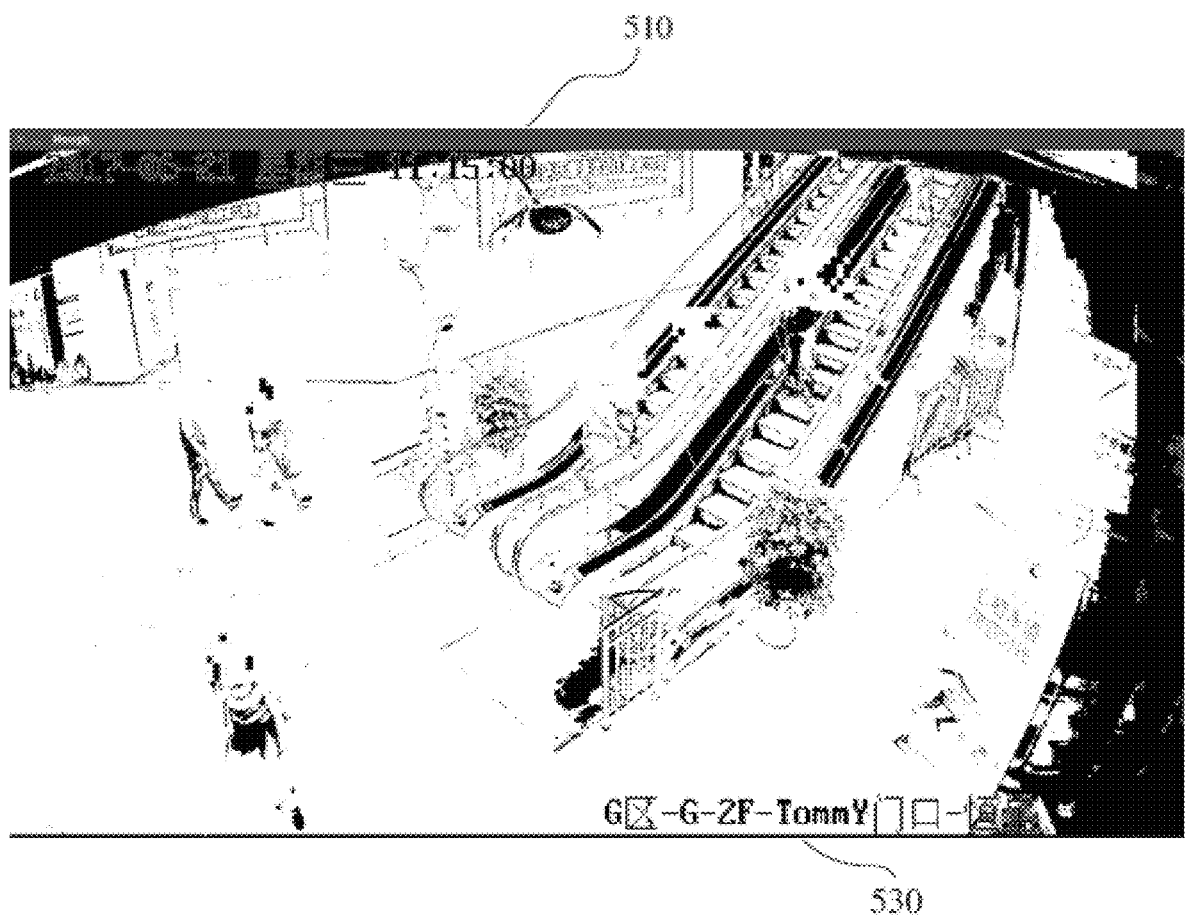
FIG. 15 is an example of a combined image obtained by performing binarization and combination on video images obtained in a video surveillance scenario according to an example embodiment.

In this way, the text in the video image becomes black, the other part, namely, the background becomes to white, and the two binary images are combined, to obtain a combined image. FIG. 15 is an example of a combined image obtained after binarization and combination are performed on a video image obtained in a video surveillance scenario according to an example embodiment. In the combined image, a time label 510 is shown at the top, and an address label 530 is shown at the bottom.

Second, binary images corresponding to the black words and the white words are used to perform connected domain detection and extraction of the connected domain candidate boundaries. In this case, the combined image is not used, to achieve the objective of avoiding interference.

The connected domain detection process may be roughly divided into three parts, first, obtaining a connected block, second, obtaining a connected region, and third, screening.

As shown in FIG. 7 to FIG. 8, connected domain search is performed in the binary image, to obtain three connected blocks shown in FIG. 7, and candidate connected regions, namely, three rectangles shown in FIG. 8, are obtained after screening is performed by using the formed rectangular boundaries.

Figure 16:
FIG. 16 is an example image in which candidate connected regions obtained according to the embodiment corresponding to FIG. 15 are distributed.

FIG. 16 is an example image in which candidate connected regions obtained according to the embodiment corresponding to FIG. 15 are distributed. As shown in FIG. 16, a plurality of candidate connected regions 610 is obtained on the binary image.

On the candidate connected regions 610 distributed in FIG. 16, referring to the implementation shown in FIG. 10, connected domain candidate boundaries 630 are extracted in the horizontal direction, and two pairs of connected domain candidate boundaries respectively corresponding to the time label 510 and the address label 530 are further obtained.

After the extraction of the connected domain candidate boundary is completed, it may be understood that, for the time label 510, the text region can be accurately obtained, but in specific implementation performed by the machine, the text content is not recognized. Therefore, the machine does not know the existence of the time label 510 and the address label 530. Therefore, the linear candidate boundaries are still extracted for the time label 510.

The extraction of the linear candidate boundaries includes: filtering based on strokes, edge detection, extension processing, linear detection, and final candidate boundary extraction based on horizontal lines and vertical lines in Chinese characters.

(1) Filtering Based on Strokes is Performed on the Combined Image.

All black pixel points are traversed to perform pixel search. Specifically, whether black pixel points whose widths are within the width threshold range exist in four natural directions and four diagonal directions is determined. If the black pixel points exist in at least one direction, the traversed black pixel points are reserved.

If no black pixel points whose widths are within the width threshold range exist, it indicates that the traversed black pixel points are noise, and the noise is deleted.

Figure 17:
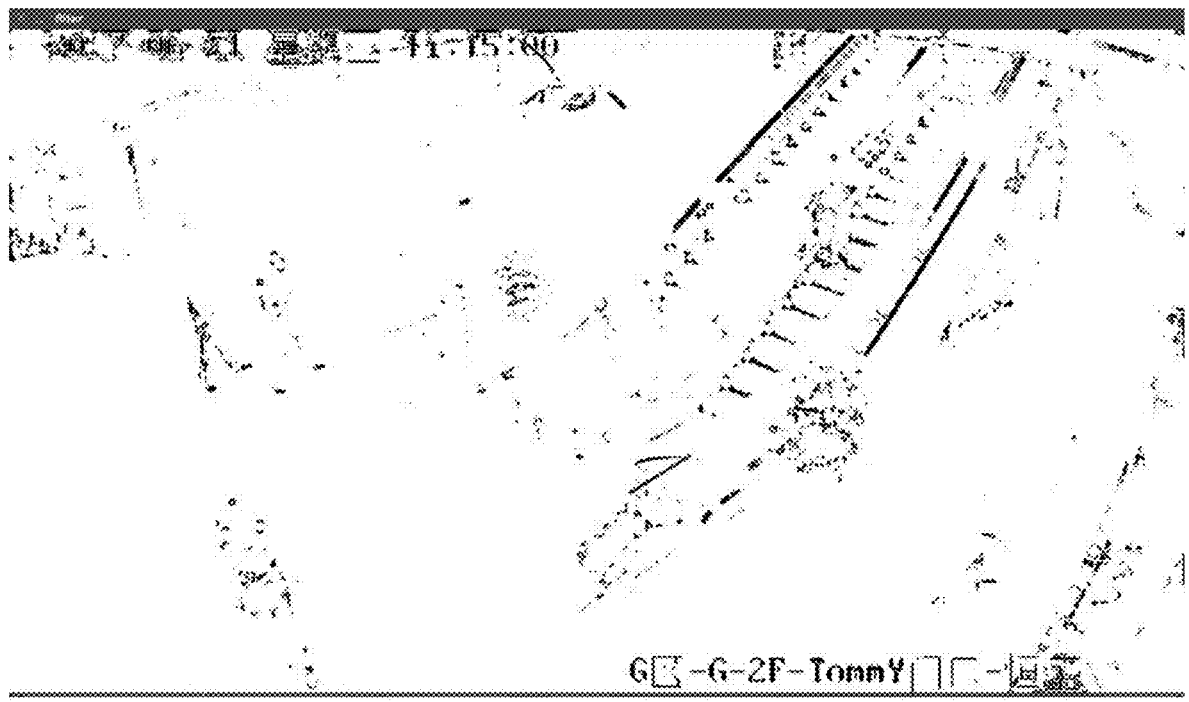
FIG. 17 is an example of an image on which filtering is completed based on strokes according to the embodiment corresponding to FIG. 16.

By analogy, the filtering based on strokes can be completed, and the overly large or overly small stroke widths are directly filtered out. FIG. 17 is an example of an image on which filtering is completed based on strokes according to the embodiment corresponding to FIG. 16.

It may be seen from FIG. 17 that the stroke contrast in the candidate connected region is in a specific region, and overly large and overly small strokes are all filtered out.

(2) Edge Detection.

Canny edge detection is performed to obtain an edge image. In this case, bold font and the junction are deleted in the canny edge detection, so that horizontal lines and vertical lines in the Chinese character strokes are segmented into short lines similar to the background noise.

(3) Extension Processing.

Extension processing is performed on the short lines formed by segmenting the horizontal lines and the vertical lines in the Chinese character strokes, for supplementing the gap. After the processing, bitwise operation is performed on an obtained image and an image output by performing stroke processing. Because the canny edge detection also makes an offset of one pixel occurring in the edge image, fusion accuracy needs to be ensured through the operation.

(4) Linear Detection.

Images output by the extension processing, namely, extended images are traversed, and the horizontal lines and vertical lines are detected to obtain a set of the horizontal lines and the vertical lines.

(5) Candidate Boundary Extraction Based on Horizontal Lines and Vertical Lines in Chinese Characters.

All pixel point positions in the candidate connected region are traversed from top to bottom and then from bottom to top, to obtain two regions including the most horizontal lines and vertical lines, and whose width is the width between the connected domain candidate boundaries.

In the two regions, the uppermost region boundary and the lowermost region boundary are extracted to form a region boundary pair. The average is taken from the width between the region boundary pair, and a center is determined by using a pixel point position mapped by the average value, to further determine the linear candidate boundaries on the center.

In this way, the server may cross the linear candidate boundaries and the connected domain candidate boundaries, to select a most suitable candidate boundary, to form a text region 710.

It should be understood that, FIG. 15 and FIG. 17 both illustrate intermediate images generated in the text region location process, and actually exist although not clear. Specifically, FIG. 15 is a combined image after binarization and combination are performed, and is an unclear image: and FIG. 17 is an image on which filtering is completed based on strokes, and is also an unclear image.

Figure 18:
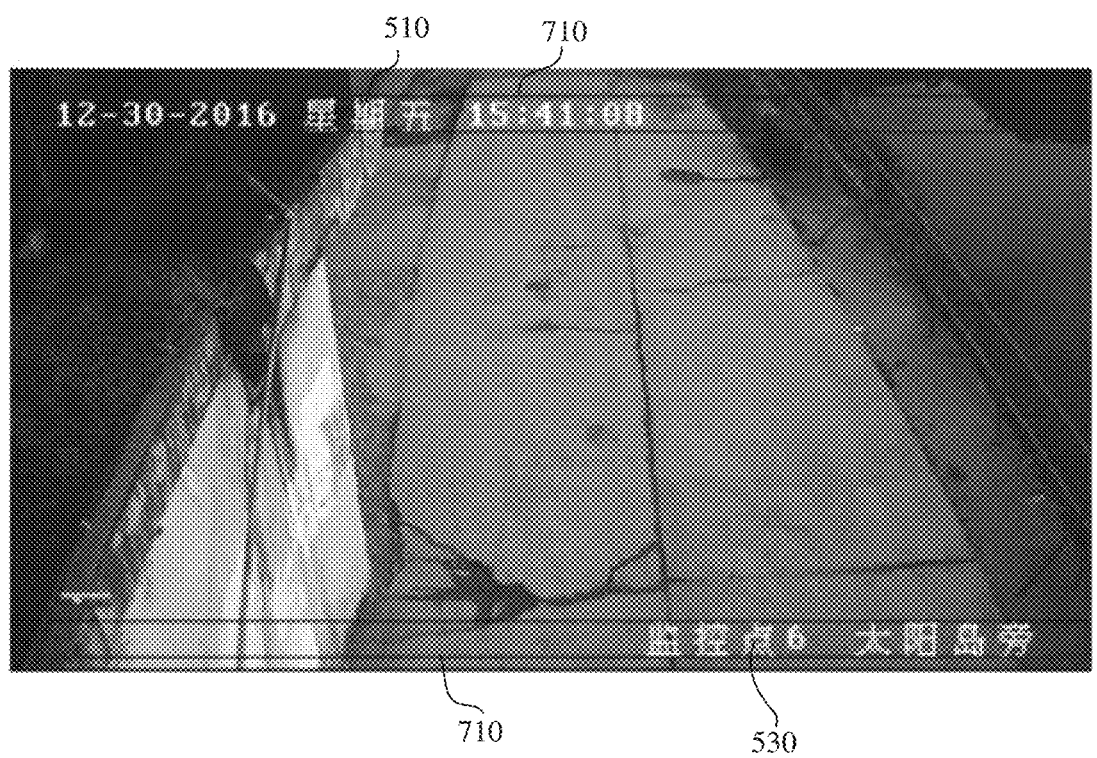
FIG. 18 is an example of an image for describing determining of a text region according to an example embodiment.
Figure 19:
FIG. 19 is an example of an image for describing determining of a text region output according to the embodiment corresponding to FIG. 17.

FIG. 18 is an example of an image for describing determining of a text region according to an example embodiment. FIG. 19 is an example of an image for describing determining of a text region output according to the embodiment corresponding to FIG. 17.

The obtained text region 710 respectively accurately locates the time label 510 and the address label 530, and has very high accuracy in text location detection, and very high anti-interference performance, so that a very good location effect for a diversified background can be obtained.

In addition, through the implementation process described above, the implementation of text location detection in the server does not need the use of a method of large data such as machine learning, and does not need a lot of accurate data. The applicability is greatly enhanced, computations are small, the system burden is reduced, and the server can even run in an embedded device with low computations.

Through the simple and rapid implementation of the text location detection in the image, text can be automatically located in a lot of images automatically, and various functions developed subsequently can be used.

The following describes the apparatus embodiment of the disclosure, which may be used for performing the embodiments of the method for locating text in an image performed by the foregoing hardware device of the disclosure. For details that are not disclosed in the apparatus embodiment of the disclosure, refer to the embodiments of the method for locating text in an image in the disclosure.

Figure 20:
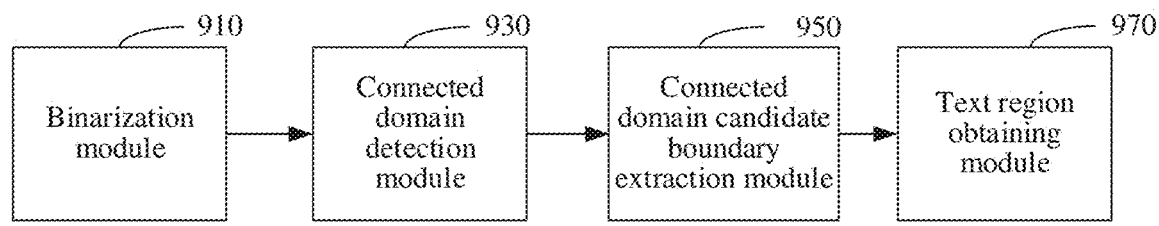
FIG. 20 is a block diagram of an apparatus for locating text in an image according to an example embodiment.

FIG. 20 is a block diagram of an apparatus for locating text in an image according to an example embodiment. The apparatus for locating text in an image includes at least: a binarization module 910, a connected domain detection module 930, a connected domain candidate boundary extraction module 950, and a text region obtaining module 970.

The binarization module 910 is configured to perform binarization processing on an image, and set pixel points corresponding to text in the image to a specified color, to obtain a binary image, the specified color being used for highlighting the text in the image and enhancing contrast of the text in the image.

The connected domain detection module 930 is configured to detect a connected domain of the specified color pixel points in the binary image, to obtain a candidate connected region.

The connected domain candidate boundary extraction module 950 is configured to extract connected domain candidate boundaries corresponding to a text region from the binary image, the connected domain candidate boundaries being extracted according to boundaries of the candidate connected region in the binary image and a text arrangement direction.

The text region obtaining module 970 is configured to obtain the text region in the image by using the connected domain candidate boundaries.

Figure 21:
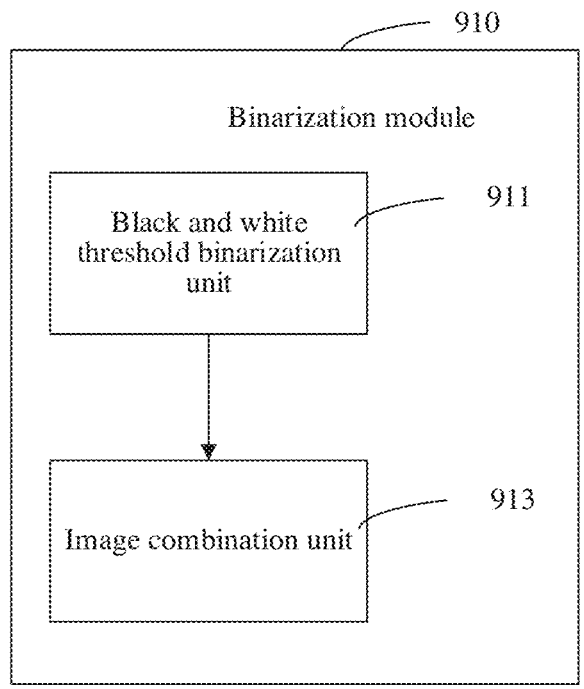
FIG. 21 is a block diagram for describing details of a binarization module according to the embodiment corresponding to FIG. 20.

FIG. 21 is a block diagram for describing details of the binarization module according to the embodiment corresponding to FIG. 20. As shown in FIG. 21, the binarization module 910 includes at least a black and white threshold binarization unit 911 and an image combination unit 913.

The image obtaining module is configured to obtain an image, where the image is used for executing its own text location detection.

The threshold binarization unit 911 is configured to perform binarization processing of setting pixel points corresponding to dark text and light text in the image to a specified color by configuring a threshold, to obtain binary images respectively corresponding to the light text and the dark text, where the dark and light division is related to the configured threshold.

In an example embodiment, the connected domain detection module 930 is configured to perform:

performing connectivity search of the specified color pixel points in the binary image, to obtain a connected block corresponding to the specified color pixel points; and obtaining a rectangular boundary for each connected block, and obtaining the candidate connected region according to the rectangular boundary.

Further, the connected domain detection module performing the obtaining a rectangular boundary for each connected block, and obtaining the candidate connected region according to the rectangular boundary includes:

obtaining, for each connected block, a rectangular boundary matching the connected block, and forming a connected region by using the rectangular boundary; and filtering out a noise connected region from the connected region, to obtain the candidate connected region.

In another example embodiment, the connected domain candidate boundary extraction module 950 is configured to perform:

determining a pixel pair position corresponding to the same quantity of the boundaries of the candidate connected region in a direction perpendicular to the text arrangement direction in the binary image; and extracting a connected candidate boundary of the text region in the text arrangement direction by using the pixel pair position.

Figure 22:
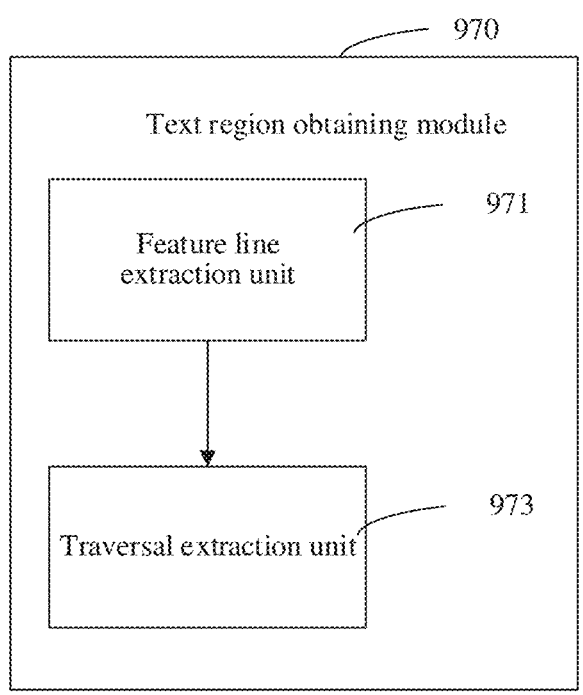
FIG. 22 is a block diagram for describing details of a linear candidate boundary extraction module according to the embodiment corresponding to FIG. 20.

FIG. 22 is a block diagram for describing details of the linear candidate boundary extraction module according to the embodiment corresponding to FIG. 20. As shown in FIG. 22, the linear candidate boundary extraction module 970 includes at least: a feature line extraction unit 971 and a traversal extraction unit 973.

The feature line extraction unit 971 is configured to obtain a line set matching the text line feature for the candidate connected region.

The traversal extraction unit 973 is configured to extract the linear candidate boundaries by using the line set, the candidate connected region, and the connected domain candidate boundaries.

Optionally, the disclosure further provides a hardware device, and the hardware device may perform all or some operations of the method for locating text in an image shown in any one of FIG. 3. FIG. 4, FIG. 5, FIG. 6, FIG. 9, FIG. 10, FIG. 12. FIG. 13, and FIG. 14 in the implementation environment shown above. The hardware device is an apparatus for locating text in an image, and the apparatus includes:

a processor;

a memory configured to store a processor executable instruction.

The processor is configured to perform:

performing binarization processing on an image, and setting pixel points corresponding to text in the image to a specified color, to obtain a binary image, the specified color being used for highlighting the text in the image and enhancing contrast of the text in the image;

detecting a connected domain of the specified color pixel points in the binary image, to obtain a candidate connected region;

extracting connected domain candidate boundaries corresponding to a text region from the binary image, the connected domain candidate boundaries being extracted according to boundaries of the candidate connected region in the binary image and a text arrangement direction; and obtaining the text region in the image by using the connected domain candidate boundaries.

The specific manners for performing operations by the processor of the apparatus in this embodiment has been described in detail in the embodiments of the method for locating an text in an image that are related to the hardware device, and are not described in detail herein again.

In an example embodiment, a computer-readable storage medium is further provided. The storage medium is a computer-readable storage medium. For example, the storage medium may be a transitory or non-transitory computer-readable storage medium including instructions.

The computer-readable storage medium stores a computer program, and when executed by a processor, the computer program implements the foregoing method for locating text in an image.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method for locating text in an image, performed by at least one processor, the method comprising:

performing binarization processing on the image, to set pixel points corresponding to text in the image to a specified color, and to obtain a binary image;

detecting a connected domain of pixels of the specified color in the binary image, to obtain a candidate connected region;

extracting connected domain candidate boundaries corresponding to a text region from the binary image, the extracting being based on boundaries of the candidate connected region in the binary image and a text arrangement direction;

extracting linear candidate boundaries in the candidate connected region according to the connected domain candidate boundaries and a text line feature; and based on a determination whether a quantity of lines matching the text line feature in the candidate connected region is greater than a specified threshold, selecting the connected domain candidate boundaries or the linear candidate boundaries, to obtain the text region in the image.

2. The method according to claim 1, wherein the performing the binarization processing comprises:

performing the binarization processing to set first pixel points corresponding to dark text and second pixel points corresponding to light text in the image to a first color and a second color, respectively, by using a first threshold and a second threshold, and obtaining binary images respectively corresponding to the dark text and the light text.

3. The method according to claim 1, wherein the detecting the connected domain comprises:

performing connectivity search of the pixels of the specified color in the binary image, to obtain at least one connected block corresponding to the pixels of the specified color; and obtaining a rectangular boundary for each of the at least one connected block, and obtaining the candidate connected region according to the rectangular boundary.

4. The method according to claim 3, wherein:

the obtaining the rectangular boundary comprises obtaining, for each of the at least one connected block, the rectangular boundary that matches a corresponding connected block, and the obtaining the candidate connected region comprises:

forming a connected region by using the rectangular boundary; and filtering out a noise connected region from the connected region, to obtain the candidate connected region.

5. The method according to claim 4, wherein the located text in the text region comprises a time label and an address label added by a camera that captured the image, and the filtering out the noise connected region comprises:

screening connected regions by applying screening parameters to the time label and the address label added by the camera, to obtain the candidate connected region based on a result of the screening; and the screening parameters comprising at least one of a connected region shape, a proportion of an area of the rectangular boundary to a quantity of actually connected pixels of the specified color comprised in the at least one connected block, or a position characteristic of the rectangular boundary.

6. The method according to claim 1, wherein the extracting the connected domain candidate boundaries comprises:

determining a pixel pair position corresponding to a length between the boundaries of the candidate connected region in a direction perpendicular to the text arrangement direction in the binary image; and extracting the connected domain candidate boundaries of the text region in the text arrangement direction by using the pixel pair position.

7. The method according to claim 1, wherein the binary image comprises binary images respectively corresponding to light text and dark text, and the performing the binarization processing comprises:

combining the binary images respectively corresponding to the light text and the dark text to obtain a combined image, the linear candidate boundaries being extracted based on the combined image.

8. The method according to claim 1, wherein the selecting the connected domain candidate boundaries or the linear candidate boundaries comprises, with respect to a connected domain candidate boundary and a linear candidate boundary extracted for the candidate connected region:

determining the text region in the image by using the linear candidate boundary based on the quantity of lines matching the text line feature in the candidate connected region being greater than the specified threshold; and determining the text region in the image by using the connected domain candidate boundary based on the quantity of lines matching the text line feature in the candidate connected region being not greater than the specified threshold.

9. The method according to claim 1, wherein the extracting the linear candidate boundaries comprises:

obtaining a line set matching the text line feature for the candidate connected region; and extracting the linear candidate boundaries by using the line set, the candidate connected region, and the connected domain candidate boundaries.

10. The method according to claim 9, wherein the obtaining the line set comprises:

performing edge detection on the candidate connected region to obtain an edge image;

performing extension processing on lines matching the text line feature in the edge image to obtain an extended image for enhancing linear features; and performing linear detection on the extended image to obtain the line set matching the text line feature in the candidate connected region.

11. The method according to claim 10, wherein before the performing edge detection on the candidate connected region to obtain the edge image, the obtaining the line set further comprises:

traversing the pixels of the specified color in the candidate connected region, and removing the pixels of the specified color based on widths between the pixels of the specified color in a surrounding natural direction and a diagonal direction and corresponding stroke edge pixel points being within a width threshold range.

12. The method according to claim 9, wherein the extracting the linear candidate boundaries comprises:

locating, pixel point by pixel point in a first direction perpendicular to the text arrangement direction in the candidate connected region, a first region in which a highest number of lines match the text line feature and that is formed according to widths between the connected domain candidate boundaries, and locating a second region in the same manner as the first region in a second direction opposite to the first direction;

extracting a region boundary pair with a greatest relative width in the text arrangement direction based on the first region and the second region;

determining a center of the linear candidate boundaries in the first direction perpendicular to the text arrangement direction according to a relative width between the region boundary pair; and extracting the linear candidate boundaries according to the center and the widths between the connected domain candidate boundaries.

13. An apparatus for locating text in an image, the apparatus comprising:

at least one memory operable to store program code; and at least one processor operable to read the program code and operate as instructed by the program code, the program code comprising:

binarization code configured to cause at least one of the at least one processor to perform binarization processing on the image, to set pixel points corresponding to text in the image to a specified color, and to obtain a binary image;

connected domain detection code configured to cause at least one of the at least one processor to detect a connected domain of pixels of the specified color in the binary image, to obtain a candidate connected region;

connected domain candidate boundary extraction code configured to cause at least one of the at least one processor to extract connected domain candidate boundaries corresponding to a text region from the binary image, extraction being based on boundaries of the candidate connected region in the binary image and a text arrangement direction; and a text region obtaining code configured to cause at least one of the at least one processor to:
extract linear candidate boundaries in the candidate connected region according to the connected domain candidate boundaries and a text line feature; and
based on a determination whether a quantity of lines matching the text line feature in the candidate connected region is greater than a specified threshold, select the connected domain candidate boundaries or the linear candidate boundaries, to obtain the text region in the image.

14. The apparatus according to claim 13, wherein the binarization code further causes at least one of the at least one processor to:
perform the binarization processing to set first pixel points corresponding to dark text and second pixel points corresponding to light text in the image to a first color and a second color, respectively, by using a first threshold and a second threshold, and obtaining binary images respectively corresponding to the dark text and the light text.

15. The apparatus according to claim 13, wherein the connected domain detection code further causes at least one of the at least one processor to perform:
performing connectivity search of the pixels of the specified color in the binary image, to obtain at least one connected block corresponding to the pixels of the specified color; and
obtaining a rectangular boundary for each of the at least one connected block, and obtaining the candidate connected region according to the rectangular boundary.

16. The apparatus according to claim 15, wherein:
the obtaining the rectangular boundary comprises obtaining, for each of the at least one connected block, the rectangular boundary that matches a corresponding connected block, and
the obtaining the candidate connected region comprises:
forming a connected region by using the rectangular boundary; and
filtering out a noise connected region from the connected region, to obtain the candidate connected region.

17. The apparatus according to claim 13, wherein the connected domain candidate boundary extraction code causes at least one of the at least one processor to perform:
determining a pixel pair position corresponding to a length between the boundaries of the candidate connected region in a direction perpendicular to the text arrangement direction in the binary image; and
extracting a connected candidate boundary of the text region in the text arrangement direction by using the pixel pair position.

18. A non-transitory computer-readable storage medium, storing a computer program, executable by at least one processor, to perform a method for locating text in an image, the method comprising:
performing binarization processing on the image, to set pixel points corresponding to text in the image to a specified color, and to obtain a binary image;
detecting a connected domain of pixels of the specified color in the binary image, to obtain a candidate connected region;
extracting connected domain candidate boundaries corresponding to a text region from the binary image, the extracting being based on boundaries of the candidate connected region in the binary image and a text arrangement direction;
extracting linear candidate boundaries in the candidate connected region according to the connected domain candidate boundaries and a text line feature; and
based on a determination whether a quantity of lines matching the text line feature in the candidate connected region is greater than a specified threshold, selecting the connected domain candidate boundaries or the linear candidate boundaries, to obtain the text region in the image.

* * * * *